Figure 1:
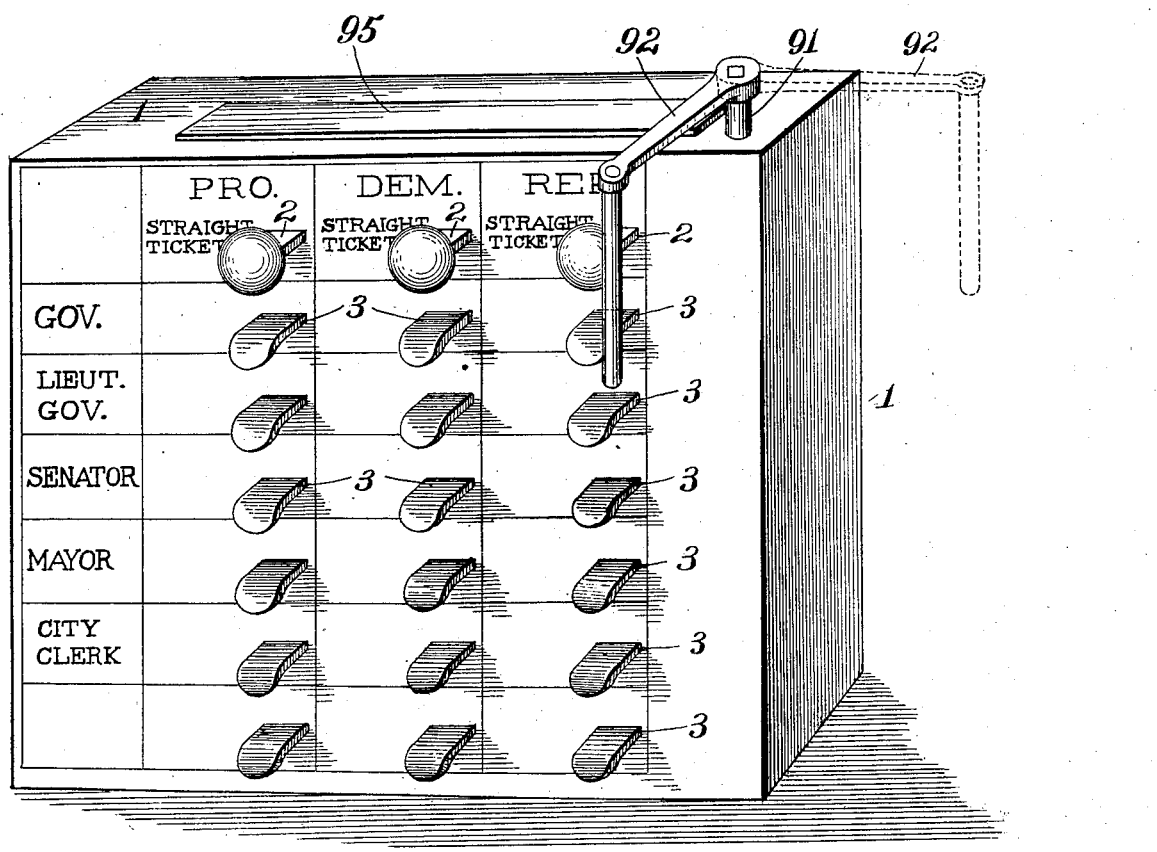

No. 726,183. PATENTED APR. 21, 1903.
A. McKENZIE.
VOTING MACHINE.
APPLICATION FILED FEB. 11, 1902.
NO MODEL. 6 SHEETS—SHEET 2.
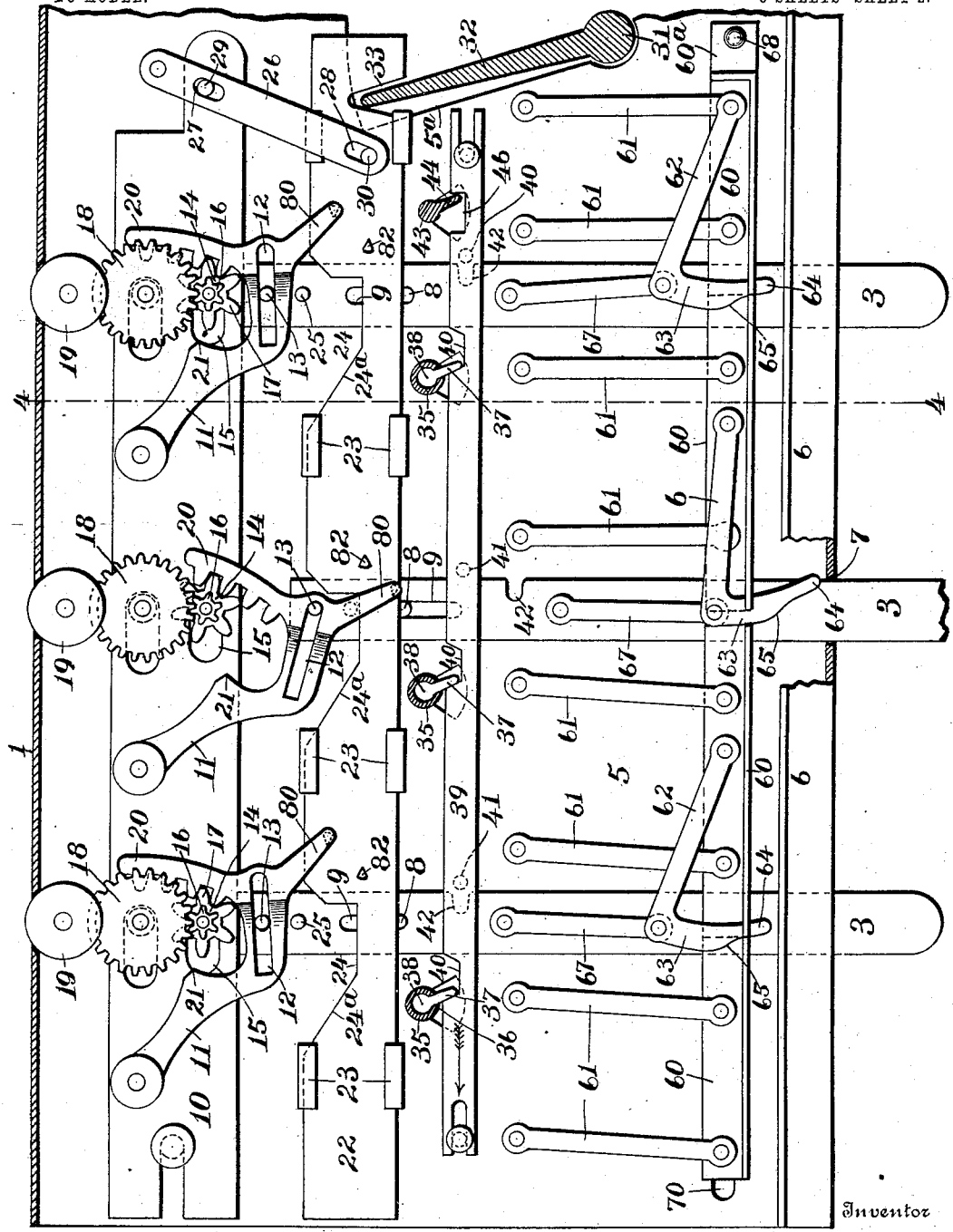
Fig. 2.
Witnesses
Percy C. Bowen
O. O. Clements
Inventor
Angus McKenzie
By
Attorney

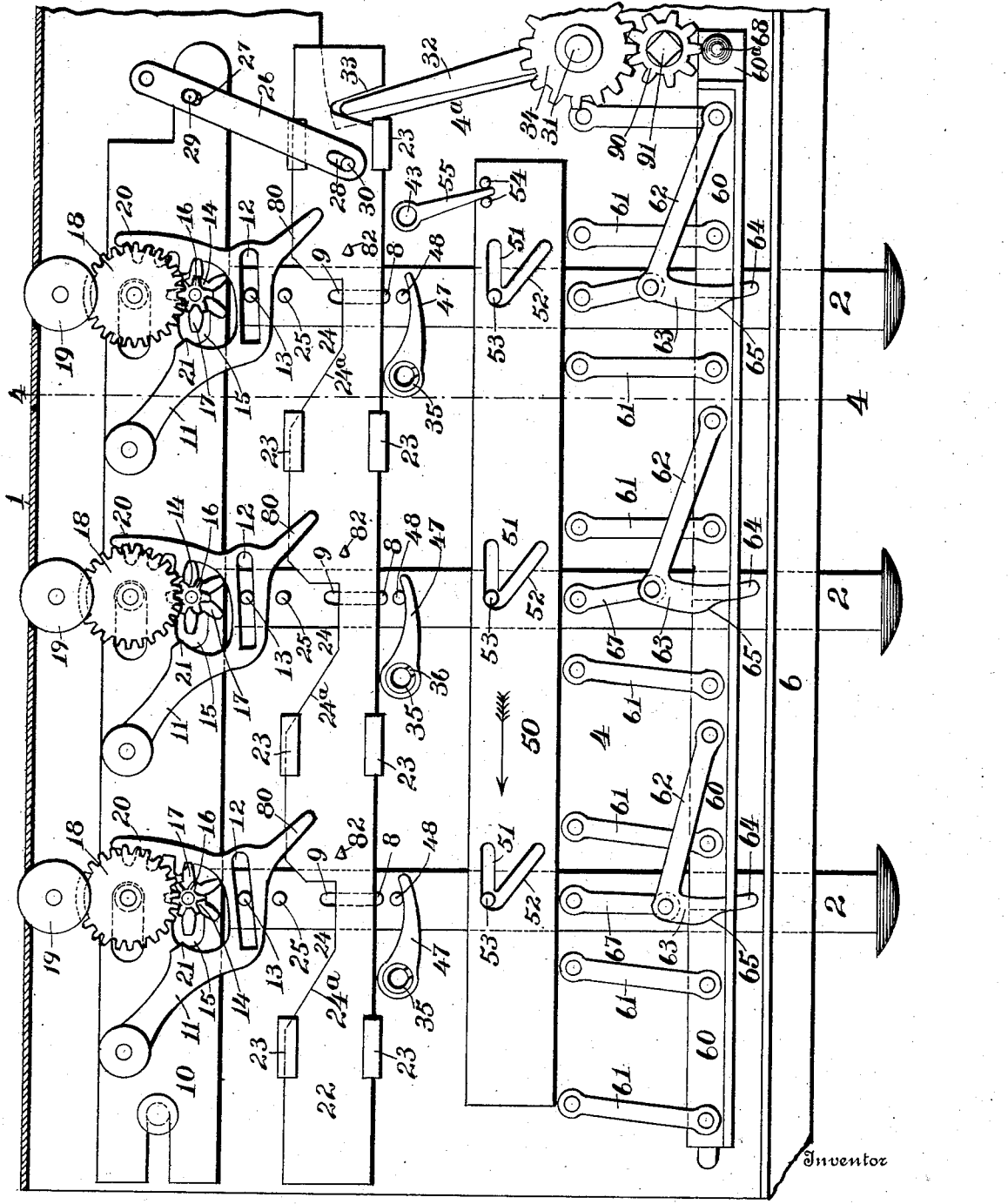

No. 726,183. PATENTED APR. 21, 1903.
A. McKENZIE.
VOTING MACHINE.
APPLICATION FILED FEB. 11, 1902.
NO MODEL. 6 SHEETS—SHEET 4.
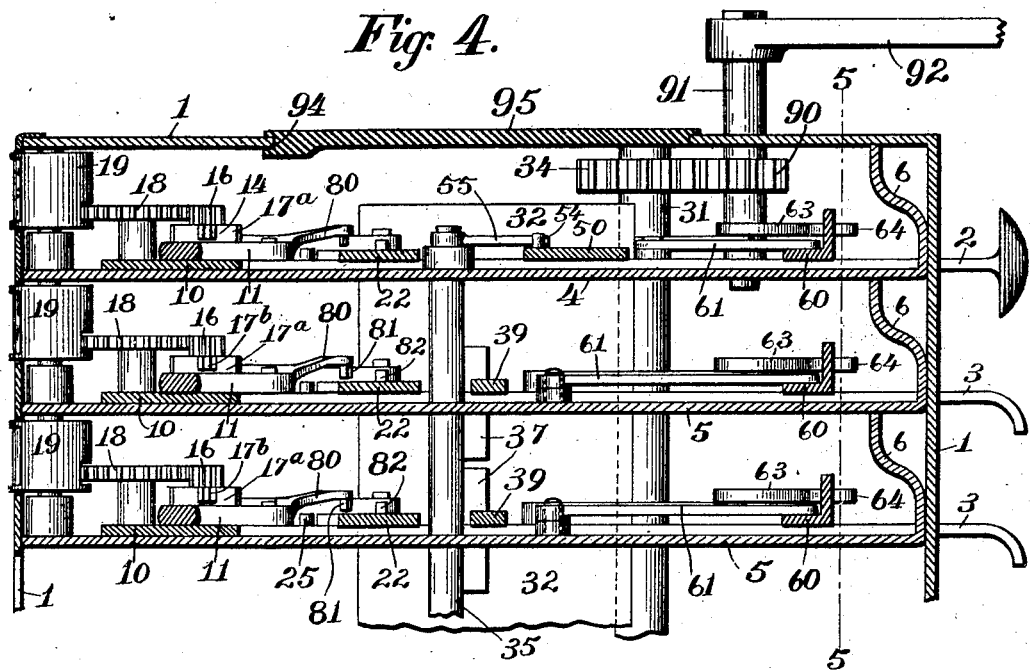
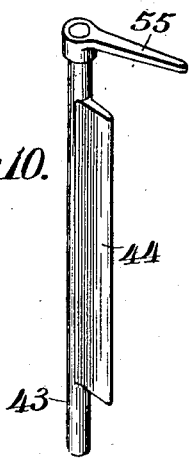
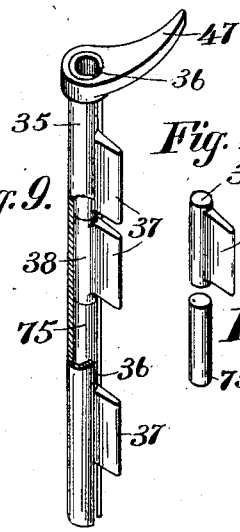
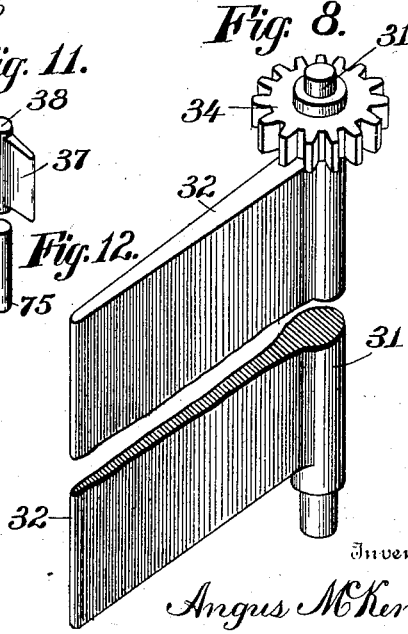

No. 726,183. PATENTED APR. 21, 1903.
A. McKENZIE.
VOTING MACHINE.
APPLICATION FILED FEB. 11, 1902.
NO MODEL. 6 SHEETS—SHEET 5.
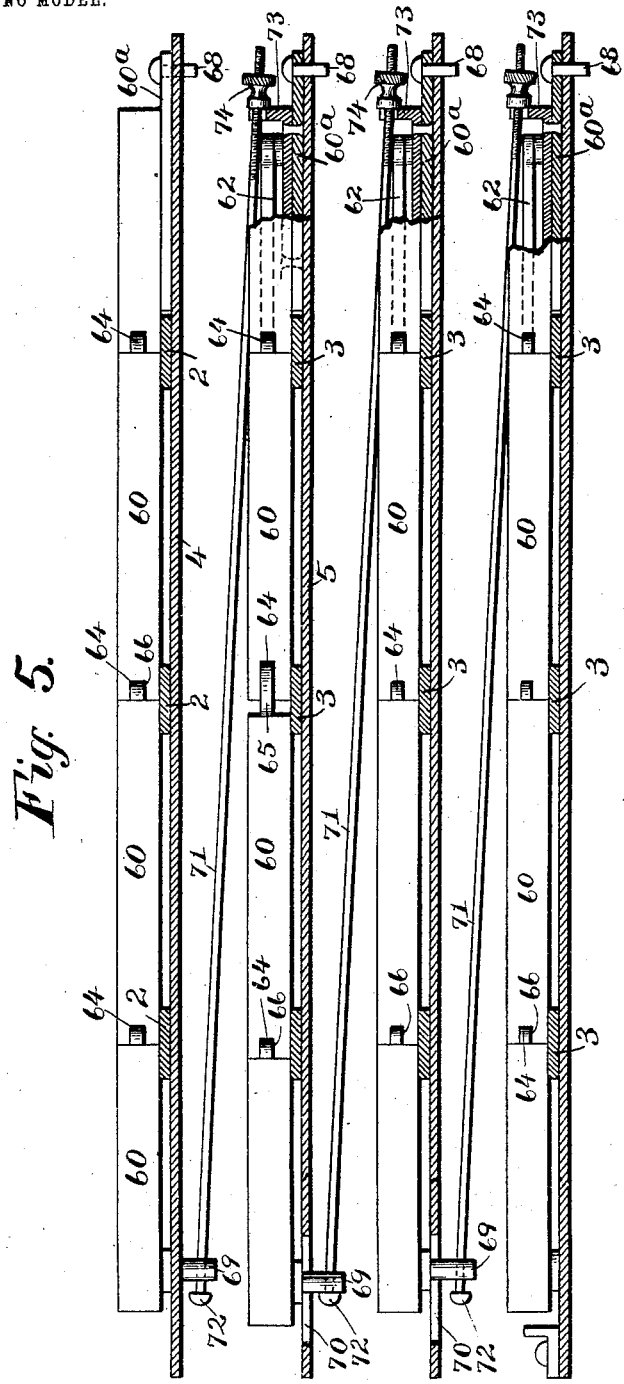
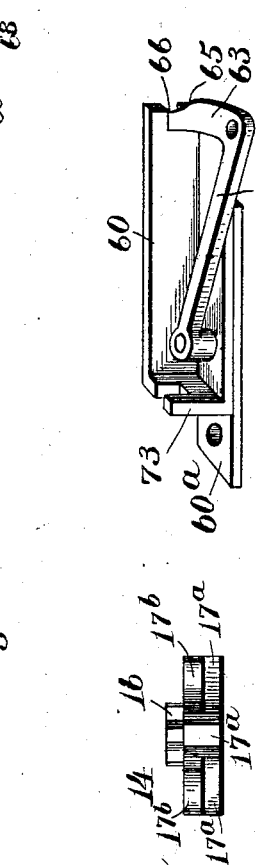
Inventor
Angus McKenzie
By
Attorney
Witnesses No. 726,183. PATENTED APR. 21, 1903.
A. McKENZIE.
VOTING MACHINE.
APPLICATION FILED FEB. 11, 1902.
NO MODEL. 6 SHEETS—SHEET 6.
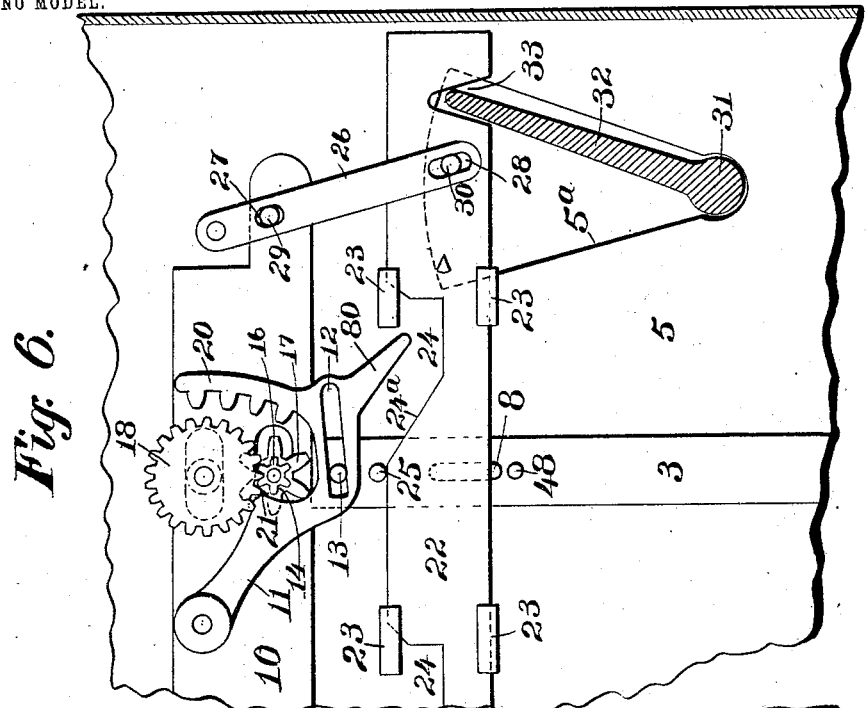
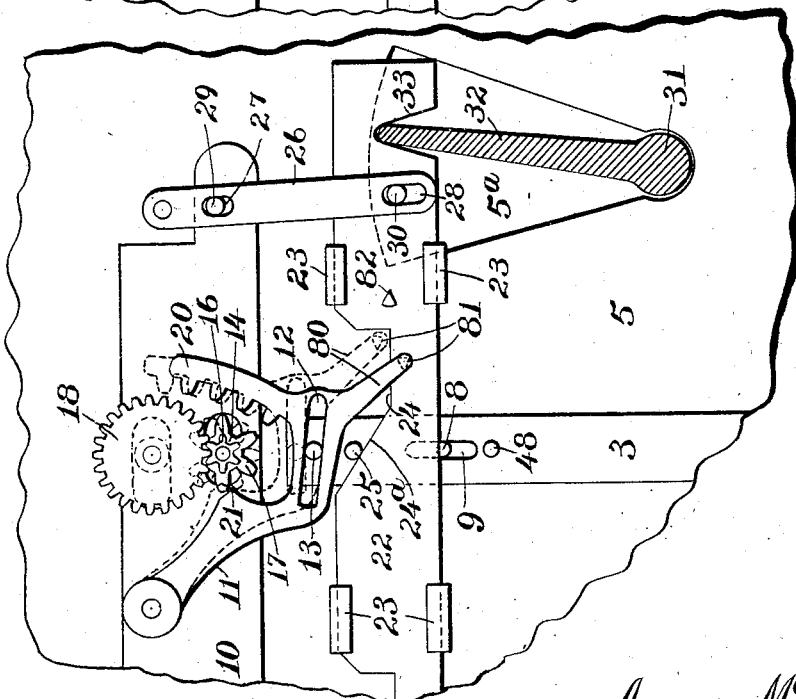
Witnesses
Percy C. Bowen
Inventor
Angus McKenzie
By Wm. N. Moore
Attorney

UNITED STATES PATENT OFFICE.

ANGUS McKENZIE, OF JAMESTOWN, NEW YORK.

VOTING-MACHINE.

SPECIFICATION forming part of Letters Patent No. 726,183, dated April 21, 1903.

Application filed February 11, 1902. Serial No. 93,539. (No model.)

*To all whom it may concern:*

Be it known that I, ANGUS MCKENZIE, a subject of the King of Great Britain, residing at Jamestown, in the county of Chautauqua and State of New York, have invented certain new and useful Improvements in Voting-Machines, of which the following is a specification.

My invention relates to improvements in voting or balloting machines; and it consists of the improved mechanism constructed and arranged as will be hereinafter fully described and claimed.

My invention will be understood by reference to the accompanying drawings, in which the same numerals of reference designate the same parts in the several views, and in which—

Figure 1 represents a perspective view of my improved voting-machine, showing the front thereof and showing the setting-lever in the position it should occupy when a vote is to be cast. Fig. 2 is a plan of one of the trays carrying the keys of a horizontal row and the mechanism operated by said keys. Fig. 3 is a plan of the tray carrying the straight-ticket keys and the mechanism operated thereby. Fig. 4 represents a vertical transverse section through the three upper trays of the machine, taken on the line 4 4 of Figs. 2 and 3. Fig. 5 represents a vertical longitudinal section taken on the line 5 5 of Fig. 4 and showing the locking-blocks and their connection from one row to another. Fig. 6 is a detail plan of the actuating mechanism for one of the counters, showing the position assumed when the resetting-lever has been operated to return the key to its normal position after voting. Fig. 7 is a similar view showing the positions assumed by the parts when the key has been only partly drawn out and the resetting mechanism has been partly operated. Fig. 8 is a perspective view of the shaft and blade for operating the resetting-bar. Fig. 9 is a perspective view of the sleeve and devices for actuating the mechanism for locking the individual keys when one of the straight-ticket keys is drawn. Fig. 10 is a similar view of the spindle and blade for unlocking the individual keys after the straight-ticket key has been returned. Figs. 11 and 12 are perspective views of a blade and a blank for insertion in the sleeve shown in Fig. 9. Fig. 13 is a perspective view looking at the under side of the double pinion which meshes with the actuator-segment. Fig. 14 represents a side view of the same. Fig. 15 is a perspective view of one of the locking-blocks with the separator pivoted thereto.

The operating parts of the machine are inclosed in a casing 1, which is securely closed and locked in any suitable manner to prevent unauthorized persons from tampering with the operating parts or recording devices. The front of the casing is provided with suitable openings for the keys 2 and 3 to project through. The keys 2 are arranged in a horizontal row at the top of the machine and are designated as the "straight-ticket" keys, each of these keys 2 being the top key of a vertical column which represents one of the parties to be voted for.

In the drawings I have shown three party-columns, designated as "Prohibition," "Democratic," and "Republican," and beneath each of the straight-ticket keys 2 I have shown six individual keys 3. It will of course be understood that the machines may be built with any number of party-columns and with any number of individual keys in the columns.

Suitable spaces are provided on the face of the machine for inscribing the names of the parties, offices, and candidates, as is usual in such machines.

Each horizontal row of keys is mounted in a tray, the straight-ticket keys 2 being mounted in a tray 4 and the individual keys 3 being mounted in the trays 5, the trays all being held one above the other in the casing in any suitable manner. The front edges of the trays are turned up, as at 6, and provided with openings 7, through which the keys extend and by which they are guided at their front ends. The inner ends of the keys are guided by pins 8, secured to the trays and extending into slots 9 in the said keys. A sliding bar 10 is arranged in the rear part of each of the trays 4 and 5, and to these sliding bars are pivoted the actuators 11, which are provided with slots 12, into which project pins 13, secured to the keys, so that when the keys are moved longitudinally the actuators will be turned about their pivots. Double pinions 14 are mounted on spindles secured to the trays and extending through slots 15 in the sliding bars 10. These double pinions 14 have two sets of teeth 16 and 17, the set of small teeth 16 meshing with a toothed wheel 18, which latter actuates the counter 19. There are preferably six teeth in each of the sets on the pinions 14, and the set of larger teeth 17 is formed of three teeth 17$^a$ of the full thickness of the pinion and three teeth 17$^b$ only half as thick as the pinion, the thick and thin teeth being arranged alternately, as shown in Figs. 13 and 14.

The actuator 11 is provided with a toothed segment 20, the teeth of which mesh with the teeth 17 of the pinion, and the said actuator is also provided with a point 21 of such a thickness as to mesh with only the thicker teeth 17$^a$.

A setting-bar 22 is arranged in suitable guides 23 just above the keys and is provided with recesses 24, having inclined sides 24$^a$, and each key is provided with a pin 25, which when the key is drawn out moves into one of the recesses 24.

An arm 26 is pivoted at one end to the tray and is provided with slots 27 and 28, into which project the pins 29 and 30 on the sliding bar 10 and the setting-bar 22.

A shaft 31 is journaled vertically in one end of the machine and provided with a blade 32, which passes through openings 4$^a$ and 5$^a$ in all of the trays 4 and 5 and extends into recesses 33 in the resetting-bars 22. The shaft 31 is provided at the top with a gear-wheel 34, which meshes with a pinion 90 on a short vertical shaft 91, which projects upwardly through the top of the casing 1 and is provided with a handle 92, by which the shafts 91 and 31 may be turned to actuate the resetting mechanism. A hollow vertical shaft 35 is journaled in the machine and extends through all of the trays 4 and 5 near each column of keys, and the said shafts are provided with longitudinal slots 36, through which project blades 37 on short pieces 38, which latter are made to fit the inside of the tubular shaft.

Above each horizontal row of individual keys 3 is arranged a locking-bar 39, which bars are guided in any suitable manner in the tray 5 and are provided with recesses 40, into which extend the blades 37 from the shafts 35. The said locking-bars are also provided with pins 41, (shown in dotted lines, Fig. 2,) adapted to engage in notches 42 in the keys 3. The recesses 40, as shown in Fig. 2, are made long enough to allow the bar 39 to move far enough to bring the pins into or out of engagement with the notches 42 in the keys without turning the shafts 35; but the parts being in the position shown in Fig. 2 if one of the shafts 35 should be turned in the direction of the arrow it would slide the bar 39 and cause the pins 41 to engage the notches 42 and lock all the keys from movement. This movement, however, would not turn any of the other shafts 35.

Near one end of the machine and in the same vertical plane with the shafts 35 is journaled a shaft 43, having a blade 44, which extends through openings in the trays 4 and 5 and into elongated recesses 46 in the locking-bars 39. Each of the hollow shafts 35 has an arm 47 secured to its upper end, and each of the straight-ticket keys 2 has a pin 48, adapted to engage the said arm 47, and thus turn one of the shafts 35 when either one of the straight-ticket keys are drawn. The movement of either one of the shafts 35 will move all the locking-bars 39, and thus lock all the individual keys 3 in the machine.

A bar 50 is arranged above the straight-ticket keys 2 and provided with longitudinal slots 51 and slots 52, opening at one end into the slots 51 and extending at an angle of approximately forty-five degrees thereto. Each of the straight-ticket keys is provided with a pin 53, which extends into the slots 51 and 52, and when the parts are in their normal position, as shown in Fig. 3, these pins are in the apex of the angle formed by the two slots. The bar 50 is provided at one end with a pair of pins 54, between which extends the end of an arm 55, secured to the upper end of the shaft 43. When one of the straight-ticket keys is drawn, the pin 53 thereon will move into the inclined slots 52 and cause the bar 50 to move in the direction of the arrow, the pins 53 on the other keys 2 entering the slots 51 and locking those keys from movement, while the pins 54 will turn the shaft 43 at the same time that the pin 48 on the key being operated is turning one of the hollow shafts 35, which moves all the locking-bars 39, thus locking all the individual keys. When the key is returned to its normal position, the locking-bar 50 will be moved back, turning the shaft 43, the blade 44 of which will slide the locking-bar 39 back to its normal position. When one of the straight-ticket keys are drawn, the bar 50 would lock all of the other straight-ticket keys from movement; but it would not prevent two or more of these keys from being drawn at a time. For this reason all of the keys on the machine are provided with a locking device consisting of a number of blocks 60, which are L-shaped in cross-section and of the right length to reach from the center of one key to the center of the next key. These blocks are arranged upon the keys and held in position by links 61, pivoted at one end to the said blocks and at the other end to the bottom of the trays 5, this allowing the blocks 60 to have a limited longitudinal movement.

Pivoted to each of the blocks 60 is a lever 62, having at its free end a segment 63, which latter is reduced in size at its end, as at 64, and has a cam-surface 65. Each of the blocks 60 is provided with a notch 66 in one end, into which the segment 63 enters, and this notch is just deep enough to allow the small end 64 of the segment to lie flush with the open edges of the notch. When the parts are in their normal position, the blocks 60 are arranged upon the keys with their ends together and the small ends 64 of the segments 60 in the notches 66, the levers 62 being connected to their respective keys by links 67. The end blocks 60 at one end of the machine are secured to the trays by pins 68, which pass through plates 60ª, secured to the blocks 60, and through the bottoms of the trays, and the blocks at the other end of the machine are secured so that they may move for a limited distance and are then held from further movement. This may be accomplished in various ways; but in Fig. 5 I have shown studs 69, projecting through slots 70 in the trays and connected by rods 71 with the blocks 60 at the opposite end of the machine. The rods 71 pass freely through holes in the studs 69 and are provided with heads 72, which limit the movement of the studs thereon, and the other ends of the rods 71 pass through the end pieces 73 of the blocks 60 at the opposite end of the machine, where they are screw-threaded and provided with thumb-nuts 74, by means of which the rods may be adjusted to allow of more or less movement of the blocks 60.

When one of the keys is drawn, as the middle key in Fig. 2, the link 67 of that key will push the segment 63 between the adjacent ends of the blocks meeting on that key, the cam 65 forcing the blocks apart and pushing the stud 69 of the end block against the head 72 on the rod 71. This rod 71 is usually set so that the movement allowed the end block will be only enough to allow the cam 65 of one of the segments 63 to enter between the blocks at a time, thus locking all the other keys in that row.

In some instances where there are groups of candidates and two or more of the candidates are to be voted for the machine may be set to allow two or more keys in one or more rows to be drawn at a time. For instance, if there were nine candidates and three of the nine were to be voted for these candidates could be represented by the nine keys of the three upper rows, in which case the pins 68 of the second and third rows would be removed. Then any three of the keys in the three upper rows could be drawn, either all three in one row or part in one row and part in another, motion being transmitted from the blocks in one row to the blocks in the next by the rods 71, as will be readily understood.

The operation of the device is as follows: The parts being in their normal position, with the keys all pushed in and the resetting-lever 92 in the position shown in dotted lines in Fig. 1, in which position the mechanism is locked, as shown in Fig. 6, a voter on entering the booth must first pull the lever 92 from the position shown in dotted lines to the forward position shown in full lines. This will unlock the mechanism, placing the parts in the position for voting. Should the voter now wish to vote a straight party-ticket, (the Democratic, for instance,) he would draw the middle knob in the top horizontal row, that being the top key in the Democratic column. The movement of this key would lock all the other straight-ticket keys and would turn one of the hollow shafts 35, thus locking all the individual or other keys on the machine, making it impossible for any other key to be drawn while the key first drawn remains out. The same movement of the key will move the actuator 11 of the key drawn into the position of the middle actuator, (shown in Fig. 2,) turning the pinion 14 a distance of two teeth and through the wheel 18 turning the counter to register one vote. Now should the voter perceive that he has made a mistake and drawn the wrong key he may push that key back, and it will bring all the parts, including the counter, back to the position occupied when the voter entered the booth, leaving the keys all unlocked, so that any key on the machine may be voted. If, however, the voter is satisfied that he has voted correctly, he will leave the key out and turn the lever 92 back to the position shown by dotted lines in Fig. 1. This will turn the shaft 31 and slide the resetting-bar 22, at the same time causing the arm 26 to slide the bar 10. These two movements will first move the actuator-segment 20 out of engagement with the pinion 14, and then the inclined side 24ª of the recess 24 will engage the pin 25 and move the key back to its normal position, bring the parts to the position shown in Fig. 6, leaving the pinion 14 and the counting devices in the position in which they were left by the drawing of the key, and leaving the mechanism in the locked position it occupied when the voter entered the booth, in which position it is ready for the next voter. If instead of voting the straight ticket the voter decides to vote for individual candidates, he may do so by drawing the individual keys. When one of the individual keys is drawn, the notch 42 therein will be moved out of line with the pin 41 in the bar 39. This will prevent said bar from being moved, thus locking all the straight-ticket keys. The same movement will push the cam 65 between two of the locking-blocks 60 in the same horizontal row with the key drawn, thus locking all the other keys in that row, but leaving the individual keys in the other rows unlocked. The counter will be operated in the same manner as before described with reference to the straight-ticket key, and the parts will be reset by the same movement of the resetting-lever. In case the voter should fail to draw the key fully out, and thus turn the pinion 14 the distance of only one tooth, the point 21 on the actuator will strike one of the thick teeth 17ª, when the resetting-lever is moved to return the key and as the parts are brought back to their normal position will complete the movement of the pinion and record the vote on the counter. This will be readily understood by reference to Fig. 7, which shows the parts in the position assumed when the point 21 first comes in contact with the tooth 17ª. When the movement is completed, the parts are brought to the position shown in Fig. 6, with one of the thin teeth 17 above the actuator. Should the movement of the key be so small that the point 21 does not come in front of the tooth 17ª, as shown by dotted lines in Fig. 7, then the said point 21 will strike the back of the tooth and return the pinion and counter to their normal positions without registering a vote; but the parts will all be brought to their normal positions, ready for the next voter. To prevent the point 21 from striking the end of one of the teeth 17ª, such actuator is provided with an arm 80, having a pointed stud 81, (shown in dotted lines in Figs. 6 and 7,) and the resetting-bars 22 are provided with similar studs 82, arranged to meet the pointed edges of the studs 81, and thus deflect the actuators far enough to cause the points 21 to strike one side of one of the teeth 17ª. This will prevent binding of the parts should the key not be drawn fully out. Should it be necessary to leave one or more of the horizontal rows of individual keys free when the straight-ticket keys are operated, blanks 75 are provided, (see Fig. 12,) these blanks being the same size as the pieces 38, (see Fig. 11;) but without the operating-blade 37 they may be inserted in the tubular shafts 35 in place of the pieces 38, thus leaving a space without the blade 37. When the blanks 75 are inserted in any row of individual keys, the straight-ticket keys may be operated without locking the individual keys in that particular row. Then this row may be used for other purposes, such as non-party voting, and will operate entirely independent of the other keys. The tubular shafts 35 are removable through an opening 94 in the top of the casing, which opening is closed by a cover 95, locked or otherwise secured in position. When the machine is arranged for voting, these tubular shafts are filled with the pieces 38 and 75 in the proper order to have a piece 38, with its blade 37, in each horizontal row where there is a nominee in that particular party and to have a blank 75 in each horizontal row where there is no nominee in that party-column. Thus if a straight-party-ticket key be drawn it will only lock such horizontal rows of individual keys as have nominees in that particular party, leaving all other rows of individual keys unlocked, so that should some office not have a nominee in one party the voting of the straight-ticket key in that party would not lock the horizontal row of keys to the office not having a nominee, but would leave that row unlocked, so that a nominee in one of the other parties could be voted for this particular office, thus giving the voter the full benefit of party as well as his freedom to split.

Having thus described my invention, what I claim, and desire to secure by Letters Patent of the United States, is—

1. In a voting-machine the combination with a series of keys and registering mechanism actuated thereby; of a series of locking-blocks having a limited movement, cams pivoted to said locking-blocks and adapted to enter between said blocks, and means connected with said keys for pushing one of said cams between said blocks when a key is drawn.

2. In a voting-machine the combination with a series of keys and registering mechanism actuated thereby; of a series of locking-blocks having a limited movement, and each block having notches in one end thereof, levers pivoted to said blocks and having segments entering said notches, cams on the said segments adapted to separate said locking-blocks, and means connected with said keys for pushing one of said cams between said blocks when a key is drawn.

3. In a voting-machine the combination with a series of keys and registering mechanism actuated thereby of a series of locking-blocks, one of said blocks being secured to the machine and the others having a limited movement, and each block having notches in one end thereof, levers pivoted to said blocks and having segments adapted to separate said locking-blocks, and means connected with said keys for pushing one of said cams between said blocks when a key is drawn.

4. In a voting-machine the combination with a series of rows of keys, and registering mechanism actuated by each key; of a series of locking-blocks for each row of keys, means for connecting the end block of one row to the opposite end block of the next row, and means for securing one of the end blocks in each row from movement, notches in the ends of said blocks, levers pivoted to said blocks and having segments entering said notches, cams on the said segments adapted to separate said blocks, and means connected with said keys for pushing one of said cams between said blocks when a key is drawn.

5. In a voting-machine the combination with a series of rows of keys, and registering mechanism actuated by each key; of a series of locking-blocks for each row of keys, means for securing the end block of each row from movement, a stud on the opposite end block of each row, a rod passing through said stud and connected with the stationary block of the next row, a head on said rod to limit the movement of said stud on said rod, and cams connected with said keys and adapted to enter between the ends of said blocks when the keys are drawn.

6. In a voting-machine the combination with a series of rows of keys, and registering mechanism actuated by each key; of a series of locking-blocks for each row of keys, means for securing the end block of each row from movement, a stud on the opposite end block of each row, a rod passing through said stud and connected with the stationary block of the next row, a head on said rod to limit the movement of said stud on said rod, means for adjusting said rods to allow more or less movement of said end blocks, and cams connected with said keys and adapted to enter between the ends of said blocks when the keys are drawn.

7. In a voting-machine, the combination of a series of keys, locking devices composed of horizontal locking-bars and vertical shafts operated by the movement of a single key to lock all the remaining keys, a registering mechanism for registering the vote of the single key operated, said locking and registering mechanism being operated by the said key, and said key when pushed in returning the locking and registering parts to normal position.

8. In a voting-machine the combination with a series of rows of keys, registering mechanism actuated by said keys, pins on said keys, and a locking-bar having slots engaging one of said pins on each key; of shafts extending through the said rows of keys, arms on the upper ends of said shafts engaging other of said pins on said keys, means connected with said shafts for locking the keys in the other rows when one of the keys in the top row is drawn, and means connected with said locking-bar for unlocking the keys when the said key in the top row is returned to its normal position.

9. In a voting-machine the combination with a series of rows of keys, registering mechanism actuated by said keys, and pins on said keys; of tubular shafts having longitudinal slots, arms on the upper ends of said shafts engaging pins on the top row of keys, pieces having blades inserted in said tubular shaft said blades extending through said slots, locking-bars above certain rows of keys having recesses engaging said blades, and means connected with said bars for locking said keys when said shafts are turned.

10. In a voting-machine the combination with a series of keys, and means whereby when one key is drawn all the other keys will be locked; of a resetting-bar and an actuator-bar, actuators pivoted to said actuator-bar and connected to said keys, toothed segments on said actuators, pinions having two sets of teeth one set meshing with said toothed segments, counters actuated by the other set of teeth on the pinion, and means for sliding the resetting-bar and the actuator-bar to return the parts to their normal positions.

11. In a voting-machine the combination with a series of keys and locking devices for the said keys of actuators operated by said keys and having toothed segments, pinions having two sets of teeth one set meshing with said toothed segments and means for moving said toothed segments out of engagement with said pinions and for returning said actuators and keys to their normal positions.

12. In a voting-machine the combination with a series of keys and locking devices for the said keys of actuators operated by the said keys, said actuators having points 21 and toothed segments 20, pinions having alternate thick and thin teeth meshing with the said toothed segments, the thick teeth engaging the points 21, recording mechanism, and gearing connecting said pinions with said recording mechanism.

13. In a voting-machine the combination with a series of keys, locking devices for the said keys, and actuators having toothed segments, points 21, and arms having points 81; of pinions having alternate thick and thin teeth, the thick teeth engaging the points 21, and all the teeth meshing with the toothed segments, recording devices, gearing connecting said pinions with said recording devices, a resetting-bar having points 82 adapted to engage the points 81 to deflect said actuators, means connected with said resetting-bar for returning the keys to their normal positions, means operated by said resetting-bar for disengaging said toothed segment from said pinion, and means for sliding said resetting-bar to bring the parts to their normal position.

14. In a voting-machine, the combination of a series of keys and registering mechanism therefor, of a series of horizontal locking-bars and means including a series of vertical hollow shafts for locking the keys in the manner described.

15. In a voting-machine, the combination of a series of keys, a series of horizontal locking-bars operated by the movement of a single key, a series of vertical locking-shafts connected to and operated by the horizontal locking-bars, and a registering mechanism.

In testimony whereof I affix my signature in presence of two witnesses.

ANGUS McKENZIE.

Witnesses:
RICHARD LEWIS,
GEO. R. BUTTS.